(12) United States Patent
Kasemann et al.

(10) Patent No.: US 6,482,525 B1
(45) Date of Patent: Nov. 19, 2002

(54) METHOD FOR PRODUCING THERMOSHAPED SUBSTRATES COATED WITH A SOL-GEL LACQUER

(75) Inventors: Reiner Kasemann, Munich (DE); Nora Kunze, Wadgassen-Schaffhausen (DE); Helmut Schmidt, Saarbruecken-Guedingen (DE); Stefan Sepeur, Wadgassen-Schaffhausen (DE)

(73) Assignee: Institut für Neue Materialien gemeinnützige GmbH, Saarbrücken (DE)

( * ) Notice: Subject to any disclaimer, the term of this patent is extended or adjusted under 35 U.S.C. 154(b) by 0 days.

(21) Appl. No.: 09/763,521

(22) PCT Filed: Sep. 1, 1999

(86) PCT No.: PCT/EP99/06438

§ 371 (c)(1),
(2), (4) Date: Feb. 23, 2001

(87) PCT Pub. No.: WO00/14149

PCT Pub. Date: Mar. 16, 1999

(30) Foreign Application Priority Data

Sep. 2, 1998 (DE) .......................................... 198 40 009

(51) Int. Cl.$^7$ ........................... B32B 9/04; B29C 51/00; B05D 3/02
(52) U.S. Cl. ........................ 428/447; 264/522; 427/387
(58) Field of Search ............................ 428/447; 516/81, 516/86; 106/267.1; 264/522; 427/387

(56) References Cited

U.S. PATENT DOCUMENTS 4,559,271 A * 12/1985 Doin et al. .............. 427/412.1

OTHER PUBLICATIONS

McGraw–Hill Encyclopedia of Science & Technology (8$^{th}$ Edition); pp. 649–651.*

* cited by examiner

Primary Examiner—Robert Dawson
Assistant Examiner—Michael J Feely
(74) Attorney, Agent, or Firm—Heller Ehrman White & McAuliffe LLP

(57) ABSTRACT

What is described is a method for producing a thermally shaped substrate coated with a sol-gel coating material, in which the sol-gel coating material comprises one or more hydrolyzable silanes, which may have been hydrolyzed to form a precondensate, and, if desired, a crosslinking agent, at least some of the hydrolyzable silanes containing on a non-hydrolyzable substituent a functional group by way of which crosslinking is possible, and in which A) the sol-gel coating material is applied to a thermally shapable substrate, B) the applied sol-gel coating material is partially pre-crosslinked and/or dried, C) the substrate coated with the sol-gel coating material is subsequently shaped thermally, and D) during and/or after the thermal shaping the sol-gel coating material is cured completely by means of thermal or photochemical crosslinking.

12 Claims, No Drawings

METHOD FOR PRODUCING THERMOSHAPED SUBSTRATES COATED WITH A SOL-GEL LACQUER

The invention relates to a method for producing a substrate coated with a sol-gel coating material, in which the substrate coated with the sol-gel coating material is shaped thermally and the complete curing of the sol-gel coating material does not take place until during and/or after the thermal shaping.

Sol-gel working materials and sol-gel coating materials are characterized by their conversion into three-dimensionally crosslinked structures by a condensation step. Since the condensation reaction proceeds spontaneously, it can certainly be accelerated by catalysts, for example, but is very difficult to stop. The crosslinking generally produces gels which are extremely brittle and fractious and permit thermal shapability only above the melting point. If parts of the inorganic bonds are replaced by organic bonds, then the three-dimensional crosslinking is maintained but becomes weaker. This does not in general lead to a state of thermal shapability, unless compounds are incorporated, such as bifunctional silanes, for example, which are able to break down linear chains and weaken the network to an extent where the three-dimensional character is barely present.

For instance, DE 3011761 describes silicic acid heteropolycondensates which have thermoshapable characteristics. These characteristics, however, are tied essentially to phenylsilanes, since these not only reduce the degree of crosslinking but also keep the molecular weight correspondingly low, in order to provide thermoshapable characteristics. There have been virtually no observations of such characteristics outside the phenylsilanes. The silicic acid heteropolycondensates described in DE 3011761 are used to bond substrates by heat sealing.

EP-A-588 508 describes coating compositions comprising a polyfunctional acrylic monomer, an amino-functional silane, colloidal silica and a polyalkylene oxide with a terminal acrylate group. When this coating composition is applied to a substrate and completely cured, the substrate thus coated can be subsequently embossed without the coating fracturing, i.e. the material is a thermoplastic. In this case, only stretching of at least 5% at room temperature is made possible; thermal shaping is not described. However, especially in the case of thermal shaping, the tensile strength is unsatisfactory.

The object of the present invention, then, was to provide a method for producing a substrate coated with a sol-gel coating material, in which a crack-free and hard coating is obtained despite thermal shaping of the substrate coated with the sol-gel coating material.

This object has surprisingly been achieved by a method for producing a thermally shaped substrate coated with a sol-gel coating material, in which the sol-gel coating material comprises one or more hydrolysable silanes, which may have been hydrolysed to form a precondensate, and, if desired, a crosslinking agent, at least some of the hydrolysable silanes containing on a non-hydrolysable substituent a functional group by way of which crosslinking is possible, and in which A) the sol-gel coating material is applied to a thermally shapable substrate,
B) the applied sol-gel coating material is partially pre-crosslinked and/or dried,
C) the coated substrate is subsequently shaped thermally, and
D) during and/or after the thermal shaping the sol-gel coating material is cured completely by means of thermal and/or photochemical crosslinking.

In one preferred embodiment, the complete curing of the sol-gel coating material takes place by means of thermal and/or photochemical crosslinking (step D) after the thermal shaping.

The method of the invention surprisingly gives substrates coated with sol-gel coating material which, despite thermal shaping beforehand, remain without fractures, cracks or splinters in the coating and which nevertheless have a hard surface.

A sol-gel coating material is a coating material prepared using the sol-gel method.

The sol-gel coating material comprises one or more hydrolysable silanes and, if desired, a crosslinking agent. The method of the invention uses sol-gel coating materials in which, for example, at least 25 mol%, preferably at least 50 mol%, with particular preference at least 75 mol%, with very particular preference 100 mol% of the hydrolysable silanes present therein contain one or more non-hydrolysable substituents having a functional group by way of which crosslinking is possible.

The crosslinking in question comprises inorganic crosslinking by way of siloxane bridges (sol-gel crosslinking) and/or organic crosslinking by way of the functional groups. The organic crosslinking may take place by way of addition polymerization, polyaddition or polycondensation reactions, preference being given to polyaddition reactions and addition polymerization reactions on account of the fact that, unlike polycondensation reactions, they do not lead to elimination products such as water or alcohols. The functional groups are selected so that crosslinking can be performed by way of the—catalysed or uncatalysed—addition polymerization, polyaddition or poly-condensation reactions.

It is possible to choose functional groups which are able to enter into the abovementioned reactions with themselves and which in so doing form the organic crosslinking.

Examples of such functional groups are epoxy-containing groups and reactive carbon-carbon multiple bonds (especially double bonds). Concrete and preferred examples of such functional groups are glycidyloxy and (meth)acryloyloxy radicals.

Additionally, the functional groups in question may comprise groups which are able to enter into—catalysed or uncatalysed—addition polymerization, polyaddition or polycondensation reactions with other functional groups (so-called corresponding functional groups). In that case it is possible to use silanes containing both functional groups, or mixtures of silanes containing the respective corresponding functional groups. If only one functional group is present in the sol-gel coating material, the corresponding functional group may be present in the crosslinking agent to be used in this case if desired. For example, a functional group with a carbon-carbon multiple bond and an SH group may enter into an addition reaction at elevated temperatures and, if desired, with catalysis. Epoxides may react, for example, with amines, alcoholic compounds such as phenols or derivatives thereof or carboxylic acids or derivatives thereof. Further preferred corresponding functional group pairings are methacryloyloxy/amine, allyl/amine or amine/carboxylic acid. If blocked isocyanates are employed, it is also possible to use amine/isocyanate, isocyanate/alcohol or isocyanate/phenol as corresponding functional groups.

It is of course also possible to use a crosslinking agent if the functional group of the silane is able to react with itself or if corresponding functional groups are present in the silanes of the sol-gel coating material. For example, in the case of silanes containing methacryloyloxy groups, it is possible to use as crosslinking agent a compound which likewise contains reactive double bonds.

The functional group is located on a non-hydrolysable substituent of the silane. A non-hydrolysable substituent is a substituent which cannot be eliminated hydrolytically from the silicon atom, and which on hydrolysis of the silane remains linked to the silicon atom of the silane.

The hydrolysable silanes preferably comprise silanes of the general formula $R_nSiX_{4-n}$. The group or groups X, which may be identical or different but are preferably identical, are hydrolysable radicals. The radicals X are preferably selected from halogen atoms (especially chlorine and bromine), alkoxy groups, alkylcarbonyl groups and acyloxy groups, particular preference being given to alkoxy groups, especially $C_{1-4}$ alkoxy groups such as methoxy and ethoxy. n may adopt the values 1, 2 or 3, preferably 1 or 2 and with particular preference 1.

The hydrolysable silanes used may also comprise fully hydrolysable silanes of the above formula in which n is 0, preferably in a fraction of less than 50 mol% based on all of the monomeric hydrolysable silanes used.

The group R or the groups R, which may be identical or different, may be alkyl, alkenyl, aryl, alkylaryl, arylalkyl or R'Y. If all hydrolysable silanes of the sol-gel coating material are silanes of the formula $R_nSiX_{4-n}$, then, for example, at least 25 mol%, preferably at least 50 mol%, with particular preference 75 mol% and, with very particular preference 100 mol% of these silanes have at least one group R'Y. R' is straight-chain or branched alkylene which may be interrupted by oxygen or sulphur atoms or NH groups, phenylene, alkylphenylene or alkylenephenylene. Y is the functional group by way of which crosslinking is possible. Examples of Y are unsubstituted or substituted amino, amide, alkylcarbonyl, unsubstituted or substituted anilino, aldehyde, keto, carboxyl, hydroxyl, alkoxy, alkoxycarbonyl, mercapto, cyano, hydroxyphenyl, alkyl carboxylate, sulphonic acid, phosphoric acid, acryloyloxy, methacryloyloxy, glycidyloxy, epoxide, allyl or vinyl groups. Preferably, Y is an acryloyloxy, methacryloyloxy, glycidyloxy, epoxide, hydroxyl or amino group.

Concrete and preferred examples of such radicals R'Y are glycidyloxyalkyl and (meth)-acryloyloxyalkyl radicals in which the alkyl radical has preferably 1 to 6 carbon atoms, especially glycidyloxypropyl and (meth)acryloyloxypropyl groups. Preferred examples of hydrolysable silanes which have a functional group on a non-hydrolysable substituent are glycidyloxyalkyltri(m)ethoxysilane, especially glycidyloxypropyltri(m)ethoxysilane, and (meth)-acryloyloxyalkyltri(m)ethoxysilane, especially (meth)-acryloyloxypropyltri(m)ethoxysilane.

In the above formulae, radicals R, R', X and/or Y occurring two or more times may in each case have the same meaning or different meanings in one compound. The following concrete examples may be given of the abovementioned groups for the radicals R, R', X and Y:

the alkyl radicals are, for example, straight-chain, branched or cyclic radicals having 1 to 20, preferably 1 to 10 carbon atoms, and especially lower alkyl radicals having 1 to 6, preferably 1 to 4 carbon atoms. Specific examples are methyl, ethyl, n-propyl, isopropyl, n-butyl, sec-butyl, tert-butyl, pentyl, n-hexyl and cyclohexyl. The aryl radicals contain, for example, 6 to 25, preferably 6 to 14 and especially 6 to 10 carbon atoms. Specific examples are phenyl and naphthyl.

The alkenyl radicals are, for example, straight-chain, branched or cyclic radicals having 2 to 20, preferably 2 to 10 carbon atoms, and especially lower alkenyl radicals, such as vinyl and allyl or 1-propenyl.

The alkoxy, alkylcarbonyl, acyloxy, alkylamino, arylalkyl, alkylaryl, alkylene, alkylphenylene, alkylenephenylene, keto, alkyl carboxylate, substituted amino and substituted anilino radicals are derived, for example, from the aforementioned alkyl and aryl radicals. Specific examples are methoxy, ethoxy, n- and i-propoxy, m-, sec- and tert-butoxy, acetyloxy, propionyloxy, benzyl, tolyl, methylene, ethylene, 1,3-propylene, trimethylene and tolylene.

These radicals may if desired carry customary substituents, examples being halogen atoms, lower alkyl radicals, hydroxyl, nitro and amino groups.

Among the halogens, preference is given to fluorine, chlorine and bromine, and particular preference to fluorine. With particular preference, the silanes in question are silanes having (non-hydrolysable) fluorine-containing radicals, especially hydrocarbon radicals. Particular preference is given in this context to silanes containing fluorinated alkyl groups, e.g. of the formula $(ZR')_nSiX_{4-n}$, where R', X and n are as defined above, R' preferably being ethylene, and Z is a perfluorinated alkyl group having 2 to 30, preferably 2 to 12 and in particular 4 to 8 carbon atoms. Fluorine-containing silanes of this kind are described, for example, in EP 587 667.

In the method of the invention it is preferred to use hydrolysable silanes which enter into a relatively slow condensation reaction. These are, in particular, silanes having substituents containing the functional group Y, e.g. alkyl groups substituted by the functional group Y. The silanes of the general formula $R_nSiX_{4-n}$ in which at least one group R is R'Y meet the condition of entering into a relatively slow condensation reaction. Compounds of the general formula $R_nSiX_{4-n}$ in which at least one group R is phenyl or relatively long-chain alkyl may also meet this condition. It is preferred, however, to use a silane which is free of these groups.

A further possibility for controlling the rate of condensation is to use organic solvents, which may also be used to adjust the viscosity of the sol-gel coating material. Depending on the nature and amount of the solvent used, changes arise in the condensation rate of the sol-gel coating material. In this context, a slower condensation rate is made possible in particular through the use of high-boiling solvents. The boiling point of such high-boiling solvents is preferably above 150° C.

Examples of suitable solvents are alcohols, preferably lower aliphatic alcohols, such as methanol, ethanol, 1-propanol, 1-propanol and 1-butanol, ketones, preferably lower dialkyl ketones such as acetone and methyl isobutyl ketone, ethers, preferably lower dialkyl ethers such as diethyl ether, amides such as dimethyl formamide and mixtures thereof. Examples of high-boiling solvents are triethylene glycol, diethylene glycol diethyl ether and tetraethylene glycol dimethyl ether. These solvents may be used alone or in their mixtures.

Depending on the desired substrate for shaping (material, density, etc.) and on the sol-gel coating material used, the use of an appropriate solvent enables the condensation rate to be adapted to the process (in respect of the heating phase, for example) in such a way that complete curing does not take place before the thermal shaping. Preferably, a retarded reaction regime is achieved in this case through the use of high-boiling solvents.

The use of special reaction inhibitors (e.g. complexing agents) is not necessary. However, complexing agents may be present in the sol-gel coating material. Examples of suitable complexing agents are chelating agents such as β-diketones (e.g. acetylacetone), β-keto esters (e.g. acetyl acetate), organic acids (e.g. acetic acid, propionic acid, acrylic acid, methacrylic acid), α-hydroxycarboxylic acids (e.g. α-hydroxypropionic acid), and alsoinorganic complex-forming species such as fluoride, thiocyanate, cyanate and cyanide ions, for example, and also ammonia and quaternary ammonium salts, such as tetraalkylammonium salts (chlorides, bromides, hydroxides, etc.), examples being tetramethylammonium and tetrahexylammonium salts.

In addition to the hydrolysable silanes, it is also possible in accordance with the invention to use hydrolysable metal compounds, preferably those derived from metals of main groups Ia, IIa, IIIa and IVa and of transition groups IVb, Vb and VIb of the periodic table, particular preference being given to compounds of aluminium, titanium and zirconium. The hydrolysable compounds of the last-mentioned elements, taking into account their substantially higher reactivity on hydrolysis and condensation than that of the silicon compounds, are preferably complex compounds. Where corresponding more active compounds are to be used, examples being the alkoxides of Al, Ti and/or Zr, it is necessary to ensure by means of appropriate measures that the high reactivity of these compounds does not lead to problems associated with the setting of the desired degree of condensation and/or of the desired viscosity; examples of such measures include working at a low temperature (e.g. 0° C. or below) and/or using the substances in small amounts and/or in high dilution.

If desired, the sol-gel coating material also includes a crosslinking agent. This is especially the case when the sol-gel coating material contains only one functional group Y which needs a corresponding functional group in order to carry out an addition or condensation reaction. In that case the crosslinking agent contains at least two functional groups which correspond to the functional group of the silane. However, it is also possible to use crosslinking agents if the functional group of the silane is able to react with itself. In that case the crosslinking agent may carry the same group or a functional group corresponding to the functional group in the silane. Here again, the crosslinking agent contains at least two functional groups.

Preferred examples of crosslinking agents which may be used are 2,2-bis(hydroxyphenyl)propane (for example for silanes containing glycidyloxy, carboxyl or epoxide groups as functional group), tetraethylene glycol dimethacrylate (for example, when the silane contains (meth)acryloyloxy or vinyl groups). Further examples of crosslinking agents which may be used are bisphenol S, bisphenol F and bisphenol A dimethacrylate, and also 1,6-hexanediol dimethacrylate, oligomeric methacrylates such as LR 8862 or LR 8907 from BASF or oligomeric urethane acrylates UA 19T from BASF.

Furthermore, the sol-gel coating material may if desired include customary additives, examples being fillers, dyes, pigments, adhesion promoters and other processing agents.

Customary fillers may be present. As fillers it is preferred to use nanoscale inorganic particulate solids (nanoparticles).

In the present description and claims, "nanoscale inorganic particulate solids" are those having an average particle size (an average particle diameter) of not more than 200 nm, preferably not more than 100 nm, and in particular not more than 70 nm. A particularly preferred particle size range is from 5 to 50 nm.

Particular preference is given to the incorporation of nanoscale oxide, metal or semiconductor particles as described, for example, in WO 93/06508. Preferred nanoparticles are oxide powders (particle size preferably up to 200 nm, in particular up to 100 nm), such as silicon dioxide, aluminium oxide (especially boehmite) and zirconium oxide, for example.

The nanoparticles may be added, for example, in the form of powders or sols. For example, a sol-gel coating material may comprise nanoparticles in an amount of up to 60 or up to 70% by weight, preferably in a range of up to 40 or up to 45% by weight.

The nanoscale inorganic particulate solids may consist of any desired materials, but preferably consist of metals and, in particular, of metal compounds such as, for example, (anhydrous or hydrated) oxides such as ZnO, CdO, $SiO_2$, $TiO_2$, $ZrO_2$, $CeO_2$, $SnO_2$, $Al_2O_3$, $In_2O_3$, $La_2O_3$, $Fe_2O_3$, $Cu_2O$, $Ta_2O_5$, $Nb_2O_5$, $V_2O_5$, $MoO_3$ or $WO_3$; chalcogenides such as, for example, sulphides (e.g. CdS, ZnS, PbS and $Ag_2S$), selenides (e.g. GaSe, CdSe and ZnSe) and tellurides (e.g. ZnTe or CdTe), halides such as AgCl, AgBr, AgI, CuCl, CuBr, $CdI_2$ and $PbI_2$; carbides such as $CdC_2$ or SiC; arsenides such as AlAs, GaAs and GeAs; antimonides such as InSb; nitrides such as BN, AlN, $Si_3N_4$ and $Ti_3N_4$; phosphides such as GaP, InP, $Zn_3P_2$ and $Cd_3P_2$; phosphates, silicates, zirconates, aluminates, stannates and the corresponding mixed oxides (e.g. those with perovskite structure such as $BaTiO_3$ and $PbTiO_3$). It is also possible to use nanoscale inorganic particulate solids provided with addition-polymerizable and/or polycondensable organic surface groups. Such addition-polymerizable and/or polycondensable nano-particles and their preparation are described, for example, in DE 197 46 885.

The organic, addition-polymerizable and/or polycondensable surface groups comprise functional groups which are able to enter into—uncatalysed or catalysed—addition polymerization, polyaddition or polycondensation reactions. Suitable functional groups are the groups mentioned above for Y. For their introduction into the nanoparticles, these groups may be introduced, for example, by way of the same hydrolysable silanes which were described above. Where addition-polymerizable nanoparticles are used which are surface modified with hydrolysable silanes, the hydrolysable silanes used in that case are taken into account in connection with the total amount of silanes used.

The sol-gel crosslinking of the sol-gel coating material is initiated by means of techniques well known to the person skilled in the art. The starting components of the sol-gel coating material are mixed with one another in the desired proportion in the absence of moisture, in solution in an organic solvent if appropriate, and subjected to hydrolysis and polycondensation. Examples of suitable solvents were given above.

Simultaneously or subsequently, water is added in at least the amount required by stoichiometry for he hydrolytic cleavage of the existing hydrolysable groups X of the silane.

The polycondensation takes place if desired with the addition of a catalyst, for example a compound which gives off protons or hydroxyl ions, or an amine.

Following the initiation of the condensation of the sol-gel coating material, steps A) to D) are carried out. The parameters used in this case, such as temperature and condensation time, are guided by the respective starting components and their proportions, by the catalyst used, etc. In principle, however, the condensation may also be initiated after step A).

If desired, before being applied to the thermally shapable substrate, the starting components of the sol-gel coating material are converted by partial hydrolysis into precondensates, whose viscosity is such that casting and coating processes can be carried out.

The sol-gel coating material is applied in step A) to a thermally shapable substrate. The thermally shapable substrate may comprise, for example, plates or films of thermally shapable plastics. Examples of thermally shapable plastics are polyethylene, polypropylene, polymethyl methacrylate, polycarbonate, ABS copolymers or polyvinyl chloride.

The sol-gel coating material may be applied in any customary manner, for example by squirting, spraying, flowcoating, brushing, dipping (including electrodeposition) or flooding. The sol-gel coating material may be applied, for example, in a wet film thickness in the range of 0.5–200 μm, preferably 70–120 μm.

In step B), the applied sol-gel coating material is partially precrosslinked and/or dried. This gives a coating which is still capable of withstanding flexural loads. Drying here means, for example, the evaporation of any organic solvent present, where inorganic condensation reactions also take place in the sol-gel coating material Partial precrosslinking means a partial crosslinking by means of inorganic sol-gel crosslinking and/or organic crosslinking. Sol-gel crosslinking is a condensation reaction in which the silanes give off water or residual alcohols to form siloxane bridges. Organic crosslinking comprises crosslinking by way of the functional groups.

The essential factor is that in step B) the sol-gel coating material is not completely crosslinked, i.e. the coating obtained is (still) plastically deformable and not brittle. The reaction may be conducted such that in step B) both the sol-gel crosslinking and the organic crosslinking take place partially. However, it is also possible, for example, for the sol-gel crosslinking to have been conducted partially or completely in step B), whereas the organic crosslinking does not take place essentially until step D). This is possible, for example, by changing the crosslinking method (in step B: thermally; in step D: photochemically). In conjunction with subsequent photo-chemical curing, it is possible to perform the drying and/or partial precrosslinking of the applied sol-gel coating material until the dust-dry state is reached.

For the subsequent step C), the coated substrate is heated. The precrosslinking of step B) takes place preferably during this heating phase. The possible drying takes place preferably prior to heating. By this means it is possible to obtain an improved storability of the coated substrates prior to the thermal shaping.

The thermal shaping in step C) may be carried out employing conventional techniques. For the shaping it is possible to use subatmospheric pressure, superatmospheric pressure or tension. It is preferred to use the thermoforming method, in particular under subatmospheric pressure.

During or after the thermal shaping, the sol-gel coating material is cured completely in accordance with step D). Where the sol-gel crosslinking and/or the organic crosslinking have/has not been carried out to completion in steps B) and C), crosslinking is completed in step D). After complete curing, the sol-gel coating material, which before complete curing is still deformable, has formed a three-dimensional network such that it no longer has any thermoplastic properties.

The organic crosslinking may comprise, for example, a thermally or photochemically induced crosslinking, depending on what functional groups are present. If desired, the sol-gel coating material comprises a catalyst/initiator or a corresponding precursor for this crosslinking. In one preferred embodiment, the sol-gel crosslinking takes place almost exclusively in step B), while the organic crosslinking takes place primarily in step D). This can be achieved, for example, by conducting step D) at a higher temperature than B), if the organic crosslinking takes place essentially not until these elevated temperatures are attained. Similarly, the sol-gel coating material may comprise a compound which releases a catalyst for the organic crosslinking (for example an acid or a base) only at the elevated temperature employed in step D). Such a compound may, for example, be a thermally activatable free-radical initiator, such as a peroxide or an azo compound, for example, which only at an elevated temperature initiates the thermal addition polymerization of, for example, methacryloyloxy groups.

Another possibility is for the organic crosslinking by way of the functional group Y to take place by means of actinic radiation, e.g. UV or laser light or electron beams. For example, the crosslinking of double bonds generally takes place under UV irradiation, in which case it may be necessary to add appropriate catalysts/initiators.

Suitable catalysts/initiators are all customary initiators/initiator systems known to the person skilled in the art, including free-radical photoinitiators, free-radical thermal initiators, cationic photoinitiators, cationic thermal initiators and any desired combinations thereof.

Specific examples of free-radical photo-initiators which may be used are Irgacure® 184 (1-hydroxycyclohexyl phenyl ketone), Irgacure® 500 (1-hydroxycyclohexyl phenyl ketone, benzophenone) and other photoinitiators of the Irgacure® type available from Ciba-Geigy; Darocur® 1173, 1116, 1398, 1174 and 1020 (available from Merck); benzophenone, 2-chlorothioxanthone, 2-methylthioxanthone, 2-isopropylthioxanthone, benzoin, 4,4'-dimethoxybenzoin, benzoin ethyl ether, benzoin isopropyl ether, benzil dimethyl ketal, 1,1,1-trichloroacetophenone, diethoxyacetophenone and dibenzosuberone.

Examples of free-radical thermal initiators include organic peroxides in the form of diacyl peroxides, peroxydicarbonates, alkyl peresters, alkyl peroxides, perketals, ketone peroxides and alkyl hydroperoxides, and azo compounds. Specific examples which might be mentioned in this case include in particular dibenzoyl peroxide, tert-butyl perbenzoate and azobisisobutyronitrile.

An example of a cationic photoinitiator is Cyracure® UVI-6974, while a preferred cationic thermal initiator is 1-methylimidazole.

These initiators are used in the customary amounts known to the person skilled in the art (preferably 0.01–5% by weight, in particular 0.1–2% by weight, based on the total solids content of the coating composition). In certain circumstances it is of course possible to forego the initiator entirely, as in the case of electron beam or laser curing, for example.

By virtue of the method of the invention, thermal shapings with stretching of more than 200% are possible. Despite these considerable deformations, crack-free and fracture-free coatings are obtained which, moreover, possess excellent abrasion resistance and hardness.

The thermally shaped substrates of the invention are used, for example, as a material for the shaping and backspraying of films for displays, as electrical components (housings for telephones, mobile phones, radios, televisions, etc.), automobile components (e.g. dashboard, control lever, side trim, etc.), toys, furniture items, aircraft parts, polymer sheets, household products, domestic appliances, thermoplastic sanitary installations (e.g. bathtubs or washbasins), flexible floor coverings (e.g. linoleum or PVC), CDs, optical components as abrasion preventatives of all kinds, for example for instrument lenses, spectacle lenses, protective goggles, headlights, interior and exterior mirrors, films for the lamination of, for example, glass, ceramic, metals, painted surfaces, wood, walls, wallpapers, machine components, bookbindings or Christmas tree baubles. The thermally shaped substrates of the invention are used wherever coated materials with a non-planar geometry are employed, especially when the coating has to be cured or aftercured.

EXAMPLES

Example 1

GPTES System (Thermal Curing)

0.6 mol (167.05 g) of glycidyloxypropyltriethoxysilane (GPTES) are introduced and are hydrolysed with 64.8 g of 0.1 N HCl, based on the hydrolysable groups of the GPTES used, for 2 h.

Subsequently, 0.24 mol (54.78 g) of 2,2-bis (hydroxyphenyl)propane (BPA) is added to this prehydrolysate. The molar ratio of GPTES to BPA is 1:0.4.

Thereafter, 180 g of a solvent mixture of triethylene glycol and tetraethylene glycol dimethyl ether in a ratio of 1:3 are added.

Immediately prior to processing, 0.5 mol% (0.240 g) of 1-methylimidazole and 1% by weight (based on GPTES) of a levelling agent (BYK 306) are added and are mixed with the coating system, with stirring (stirring time 2 h).

The coating is applied by flooding with a wet film thickness of 100 $\mu$m to a primed PMMA plate and a vacuum deformation is carried out using a pilot plant. The coating system is heated on the PMMA plate using IR lamps at 175° C. for about 5 minutes. After about 5 minutes, the 4 mm thick PMMA plate which has been provided with a coating can be thermoformed (stretching>200%), although the coating system does not yet undergo through-curing during this process. Thermoforming is followed by a thermal after cure by means of the switched-on IR lamps of about 5–10 minutes, during which the system undergoes complete organic and inorganic through-curing.

A defect-free coating without cracks or fractures is obtained.

To characterize the coated substrates, a cross-cut (GT) tape test (TT) was conducted, and for the abrasion resistance in accordance with scattered light loss a Taber Abraser test.
Result
GT/TT (1/1) and Taber Abraser (after 1000 cycles; CS 10 F, 5.4 N), 7.2% haze.

Example 2

MPTS System (UV Curing)

0.5 mol (124.4 g) of methacryloyloxypropyltrimethoxysilane (MPTS) is added to 49.76 g of boehmite sol and the mixture is heated in an oil bath to a temperature of 50° C.

For hydrolysis, 0.75 mol of deionized water is added to the mixture. The system is heated to 100° C. and boiled under reflux for 2.5 h.

After the mixture has cooled, 37.43 g of tetraethylene glycol dimethacrylate and 134.38 g of the respective solvent or solvent mixture are added.

The following solvents were used successfully in this case:
1.) 1-butanol (incipient thermal drying possible)
2.) diethylene glycol diethyl ether
3.) triethylene glycol/tetraethylene glycol dimethyl ether (ratio 1:3)
4.) diethylene glycol diethyl ether/tetraethylene glycol dimethyl ether (1:1)
5.) 1-butanol/tetraethylene glycol dimethyl ether (1:1)

For free-radical crosslinking, 2% by weight (2.49 g) of benzophenone, based on MPTS, are used as photoinitiator.

With this synthesis regime, there are two possibilities for carrying out shaping:
1. If high-boiling solvents are added, shaping takes place as in Example 1, the aftercure of the coat taking place by UV irradiation in contradistinction to the thermally curing system.
2. Following application of the coat to corresponding thermoplastic substrates (plates or films), the coat is incipiently dried to the dust-dry state, drying being effected thermally in an oven at 90° C. for 2 h. This coated substrate, which can be stored in the absence of light, can then be shaped and subsequently cured by UV exposure, the coats possessing high abrasion resistance after the UV aftercure.

Coatings with a UV aftercure have the advantage that, with the exception of PP and PE there is no need to pretreat the thermoplastic substrates (PMMA, PC, ABS, etc.) in order to achieve adhesion of the coat.

Defect-free coated substrates without cracks or fractures are obtained.

To characterize the coated substrates, a cross-cut (GT) tape test (TT) was conducted, and for the abrasion resistance in accordance with scattered light loss a Taber Abraser test.
Result
GT/TT (0/0) and Taber Abraser (after 1000 cycles; CS 10 F, 5.4 N), 15% haze.

We claim:
1. A method for producing a thermally shaped substrate coated with a solgel coating material, comprising the steps of:
    (A) applying to a thermally shapeable substrate, a sol-gel coating material comprising (i) at least one hydrolyzable silane that has optionally been hydrolyzed to form a precondensate, wherein at least 25 mol % of the at least one hydrolyzable silane contains a non-hydrolyzable substituent comprising a functional group capable of crosslinking, and optionally, (ii) a crosslinking agent;
    (B) drying and optionally partially precrosslinking the applied sol-gel coating material on the substrate to form a coated substrate, wherein the sol-gel coating material is not completely crosslinked;
    (C) heating and thermally shaping the coated substrate; and
    (D) completely curing the sol-gel coating material during and/or after the thermal shaping.
2. The method of claim 1 where the drying and optional partial precrosslinking of step (B) takes place during heating of the substrate in preparation for the thermal shaping of step (C).
3. The method of claim 1 where the complete curing of the sol-gel coating material of step (D) takes place after the thermal shaping of step (C).
4. The method of claim 1 where the complete curing of the sol-gel coating material of step (D) is thermal or photochemical crosslinking.

5. The method of claim 1 where the sol-gel coating material comprises nanoscale inorganic particulate solids.

6. The method of claim 5 where the nanoscale inorganic particulate solids are nanoscale oxide particles.

7. The method of claim 6 where the nanoscale oxide particles are particles of silicon dioxide, zirconium oxide or aluminum oxide.

8. The method of claim 6 where the nanoscale oxide particles are particles of boehmite.

9. The method of claim 5 where the nanoscale inorganic particulate solids have addition-polymerizable and/or polycondensable organic groups on the surface thereof.

10. The method of claim 1 where essentially all the hydrolyzable silanes contain a non-hydrolyzable substituent comprising a functional group.

11. The method of claim 1 where the functional group is an acryloyloxy, methacryloyloxy, glycidyloxy, allyl, vinyl, carboxyl, mercapto, epoxide, hydroxyl, amide, or amino group.

12. A thermally shaped substrate coated with a sol-gel coating material, prepared by the method of claim 1.

\* \* \* \* \*